Patented June 22, 1937

2,084,390

UNITED STATES PATENT OFFICE 2,084,390

MANUFACTURE OF HYDRATION PRODUCTS OF OLEFINES

Henry Dreyfus, London, England

No Drawing. Application August 25, 1933, Serial No. 686,732. In Great Britain September 7, 1932

4 Claims. (Cl. 260—151)

This invention relates to the manufacture of hydration products of olefines, and especially to the manufacture of ethyl alcohol or diethyl ether by the hydration of ethylene, and is a continuation in part of my U. S. application S. No. 644,491 filed 26th November, 1932.

In my said application I have shown that hydration products of olefines, and especially ethyl alcohol and diethyl ether may be formed by the hydration of the corresponding olefines by means of water or water vapor in the presence of salts having a high affinity for water, and especially in the presence of acid salts or salts of an acid character having a high affinity for water.

I have now found that this reaction between water and olefines may be carried out quite generally in the presence of solid substances possessing affinity for water. Thus, for example, salts and other compounds which are capable of existing in both an anhydrous and a hydrated form or in at least two hydrated forms may usefully be employed. Such hydrated forms may comprise water in chemical combination, or water of crystallization etc.

Thus for example salts of the halogen acids such as barium chloride and cobalt chloride may be employed, or simple or complex salts of oxy acids such as boron phosphate, sodium borate (borax), copper sulphate, chromium sulphate, ferric sulphate, magnesium pyrophosphate, tetrapotassium pyrophosphate, sodium potassium molybdate, sodium or calcium tungstate, sodium orthovanadate, calcium metavanadate, barium meta-antimonate, trisodium arsenate, etc. Moreover oxides having affinity for water, and especially oxides having an acid or neutral reaction, such as boron trioxide, may also be employed. It is however to be understood that the compounds mentioned above are intended merely as examples of the large number of substances having affinity for water that may be used for the purposes of the invention.

The reaction may be performed at temperatures upwards of about 100° C., and especially at temperatures between about 150° and 350° C. Elevated pressures are very useful for accelerating the reaction, for example pressures of about 15 to 25 atmospheres or more.

In applying the invention I preferably pass mixtures of ethylene and steam over, through or otherwise in contact with the catalysts under the desired conditions of temperature and pressure. For instance, such mixtures may be passed under the desired temperature and pressure conditions, through tubes or the like containing the catalysts or containing the catalysts supported upon or in association with filling materials or carriers, e. g. pumice, kieselguhr, carborundum. Alternatively the mixtures may be passed through molten or liquid baths comprising the catalyst in the manner described in my U. S. application S. No. 640,002 filed 28th October, 1932, or they may be passed through aqueous solutions of the catalysts, as described in my U. S. application S. No. 640,001 filed 28th October, 1932, or any other convenient method may be employed.

The proportions of olefine and water vapor to be employed will depend largely on the nature of the desired product. Thus, if a product containing a large proportion of, for example, diethyl ether is required, it is preferable to employ mixtures containing at least two volumes of ethylene to each volume of water vapor. If on the other hand ethyl alcohol is to be the main product, mixtures containing a higher proportion of water vapor may be employed. Preferably, however, large excess of water vapor is avoided, as such excess tends to produce a dilute alcohol, or to render the recovery of a concentrated alcohol a matter of difficulty.

While I prefer to employ mixtures of the olefine and steam, the invention is in no wise limited in this respect as, if desired, the water may be employed in liquid form. For example, ethylene may be passed in contact with aqueous solutions of the catalysts in the manner described in my U. S. application S. No. 640,001 filed 28th October, 1932.

The invention is not restricted to the hydration of ethylene but may be applied, irrespective of the mode of execution, to the hydration of olefines in general. Thus, for instance, the invention may be applied to the production of isopropyl alcohol from propylene or to the hydration of higher homologues of propylene, such, for instance, as butylene. If desired, mixtures of olefines, whether or not containing ethylene, may be subjected to the process of the invention.

The following examples illustrate the invention but are not to be considered as in any way limitative.

Example 1

A mixture of approximately 3 volumes of ethylene and 2 volumes of water vapor is preheated to a temperature of about 250° C. and is then passed over sodium orthovanadate deposited on pumice and heated to a temperature of 330° C. under a pressure of 25 atmospheres. The vapors on leaving the reaction zone are cooled while still under pressure, and the ethyl alcohol formed is condensed and may be separated from the water remaining after the reaction and from any ether formed in the reaction in any convenient way. Advantageously the unchanged ethylene remaining is mixed with further water vapor and re-circulated through the reaction zone.

Example 2

A mixture of approximately 3 volumes of ethylene and 1 volume of water vapor is preheated to about 250° C. and is passed over finely powdered boron trioxide heated to a temperature of 340° C. under a pressure of 25 atmospheres. The main product of the reaction is diethyl ether which may be separated from the water vapor remaining and from any alcohol formed in any convenient way.

By the term water as employed in the claims I mean water either in the liquid or vapor phase.

What I claim and desire to secure by Letters Patent is:—

1. Process for the manufacture of hydration products of olefines, which comprises bringing an olefine into contact with water at elevated temperatures in the presence of a salt containing a metallic element and oxygen in the acid radicle and capable of existing in a plurality of hydrated forms differing only in their degree of hydration.

2. Process for the manufacture of hydration products of olefines, which comprises bringing an olefine into contact with water at an elevated temperature in the presence of a salt selected from the group which consists of molybdates, tungstates, vanadates, antimonates and arsenates, and capable of existing in a plurality of hydrated forms differing only in their degree of hydration.

3. Process for the manufacture of hydration products of ethylene, which comprises bringing ethylene into contact with water vapor, at a temperature between 150° and 350° C., in the presence of a salt containing a metallic element and oxygen in the acid radicle and capable of existing in a plurality of hydrated forms differing only in their degree of hydration.

4. Process for the manufacture of hydration products of ethylene, which comprises bringing ethylene into contact with water vapor, at a temperature between 150° and 350° C. and under superatmospheric pressure, in the presence of a salt containing a metallic element and oxygen in the acid radicle and capable of existing in a plurality of hydrated forms differing only in their degree of hydration.

HENRY DREYFUS.